United States Patent [19]

Janneck

[11] 4,022,692

[45] May 10, 1977

[54] NON-WOVEN SUPPORT SCREEN FOR MASS TRANSFER DEVICES

[75] Inventor: Howard A. Janneck, Fort Lee, N.J.

[73] Assignee: Erika, Inc., Engelwood Cliffs, N.J.

[22] Filed: Aug. 1, 1975

[21] Appl. No.: 601,193

[52] U.S. Cl. .................. 210/321 B; 210/494 M; 23/258.5 M
[51] Int. Cl.² ................................. B01D 31/00
[58] Field of Search ...... 23/258.5; 210/321, 433 M, 210/494 M

[56] References Cited

UNITED STATES PATENTS

| | | | |
|---|---|---|---|
| 3,565,258 | 2/1971 | Lavender | 210/321 |
| 3,743,098 | 7/1973 | Martinez | 210/494 MX |
| 3,813,334 | 5/1974 | Bray | 210/494 M X |

Primary Examiner—Frank A. Spear, Jr.
Assistant Examiner—Ferris H. Lander
Attorney, Agent, or Firm—Morgan, Finnegan, Pine, Foley & Lee

[57] ABSTRACT

An improved non-woven support screen for mass transfer devices including a first set of parallel spaced longitudinally extending filaments having a predetermined thickness or diameter and a second set of parallel spaced filaments obliquely arranged relative to the first set of filaments and having a predetermined thickness or diameter approximately ½ that of the first set of filaments to provide improved control of membrane distention for minimizing the masking of the membrane surface by preventing excessive distention in one plane, to reduce the volume of body fluid layer in the membrane (low prime), and provide improved mass transfer efficiency while maintaining gentle mixing of the body fluid. Moreover, the velocity gradient of the exchange fluid is enhanced by the limited space provided for the exchange fluid channels to significantly improve the scrubbing action of the exchange fluid on the membrane surface. Advantageously, the larger diameter of the filaments of the first set provides low operating fluid pressure within the membrane channels by allowing selective distention of the membrane.

9 Claims, 7 Drawing Figures

NON-WOVEN SUPPORT SCREEN FOR MASS TRANSFER DEVICES

The present invention relates to mass transfer devices, and more particularly to an improved non-woven support for mass transfer devices. Examples of mass transfer devices in which the present invention is particularly useful are artificial kidney dialyzers and oxygenators. Other devices using dialysis or ultrafiltration in which different fluids are separated by a semipermeable or permeable membrane may also advantageously employ the improved non-woven support screen of the present invention.

Generally, kidney dialysis coils include a core with a spiral wrapping of a flat semipermeable tubular membrane, usually Cuprophan, a cellulose plastic sold by Enka Glanzstoff of West Germany, and a support screen, e.g., of the type such as disclosed in U.S. Letters Pat. Nos. 3,709,367 or 3,743,098.

The support screens disclosed in the aforementioned patents include first and second sets of spaced parallel triangular filaments of equal cross-sectional area which lie in separate planes and are biased relative to one another. In U.S. Pat. No. 3,743,098, it is suggested that the triangular filaments of one set be spaced apart an unequal distance of approximately two to three times the spacing between the filaments of the other set. While such an asymmetric triangular support screen appears to have certain advantages over prior symmetric support screens having round filaments, e.g., of the type disclosed in U.S. Letters Pat. No. 3,508,662, it has the inherent disadvantage of causing leakage in the tubular membrane since the tubular membrane is sandwiched in point contact between the sharp apices of the triangular filaments. Moreover, all the foregoing support screens fail to adequately control membrane distention with the result that masking of the membrane often occurs.

It is an object of the present invention to provide an improved non-woven support screen for mass transfer devices.

It is a further object of the present invention to provide an improved non-woven support screen for mass transfer devices which provides improved control of membrane direction to eliminate masking.

It is a still further object of the present invention to provide an improved non-woven support screen which prevents damage to the sandwiched tubular membrane.

It is a still further object of the present invention to minimize body fluid volume within the fluid compartment (membrane) of a mass transfer device;

It is a further object of the present invention to provide an improved non-woven support screen which provides gentle agitation of the body fluid (blood) and a heightened simultaneous scrubbing action of the exchange fluid on the membrane.

Other objects, aspects, and advantages of the present invention will be apparent from the detailed description and the drawings.

Briefly, an improved non-woven support screen for mass transfer devices is provided in accordance with the present invention including a first set of parallel spaced longitudinally extending filaments having a predetermined thickness or diameter and a second set of parallel spaced filaments obliquely arranged relative to the first set of filaments and having a predetermined thickness or diameter approximately ½ that of the first set of filaments, preferably within the range of from about 0.37 to about 0.67, and most preferably about 0.47, to provide improved control of membrane distention for minimizing masking of the exterior surface of the membrane by preventing excessive distention in one plane, to reduce the volume of body fluid in the membrane (low prime), and to provide improved mass transfer efficiency while maintaining gentle mixing of the body fluid. Moreover, the velocity gradient of the exchange fluid is enhanced by the limited spaced provided for the exchange fluid channels to increase the scrubbing action of the exchange fluid on the membrane surface. Advantageously, the larger diameter of the filaments of the first set provides low operating fluid pressure within the membrane channels by allowing selective distention of the membrane. Moreover, the filaments of the first and second sets are of round cross-sectional area to prevent damage to the sandwiched membrane. Preferably, the filaments of the second set are arranged at an angle of about 49° to about 55°, most preferably 52°, relative to the filaments of the first set, and the spacing between centerlines of the filaments of the first set is preferably between about 1.88 to about 2.54, most preferably about 2.18, times that of the spacing between the filaments of the second set.

The preferred embodiment of the present invention is illustrated in the accompanying drawings, which should be construed as illustrative of the present invention; it should be expressly understood that the present invention should not be construed as being limited solely to the preferred embodiment as shown in the drawings. As shown in the drawings.

Figure 1:
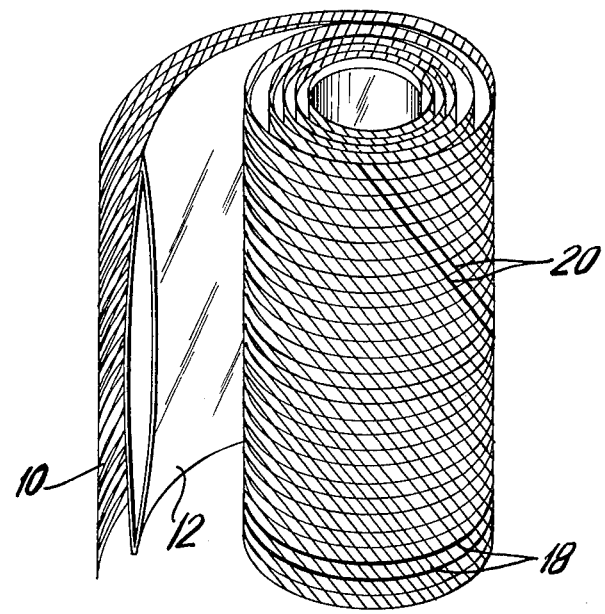
FIG. 1 is a perspective view of the improved non-woven support screen of the present invention partially wound in a spiral, with a sandwiched tubular membrane, about a core which has been omitted for clarity.

Referring to FIG. 1, the improved non-woven support screen 10 and a fluid transfer membrane, preferably a flat semipermeable tubular membrane 12, are illustrated partially wound in spiral relationship about an inner core (not shown). The fully wound spiral coil with its accompanying inlet and outlet connectors and tubing, is positioned in a kidney dialysis apparatus, e.g., of the general type disclosed in U.S. Letters Pat. No. 3,743,098 or U.S. Letters Pat. No. 3,508,662. However, it should be understood that the support screen 10 may be used with oxygenators or other dialysis, ultrafiltration, reverse osmosis devices, as well as other mass transfer devices, as desired.

The flat semipermeable tubular membrane 12 and support screen 10 are wound with the membrane 12 on the inside of the support 10 so that membrane 12 forms the first interior layer of the coil and the support screen 10 ultimately forms the exterior layer of the coil, see FIG. 1. Advantageously, the membrane 10 of the coil may have predetermined pleats formed therein as disclosed in copending application Ser. No. 600,955, filed on even data herewith and having the same assignee as the instant application, and be coupled at its ends to inlet and outlet fluid manifolds as disclosed in copending application Ser. No. 600,961, filed on even data herewith and having the same assignee as the instant application.

Figure 2:
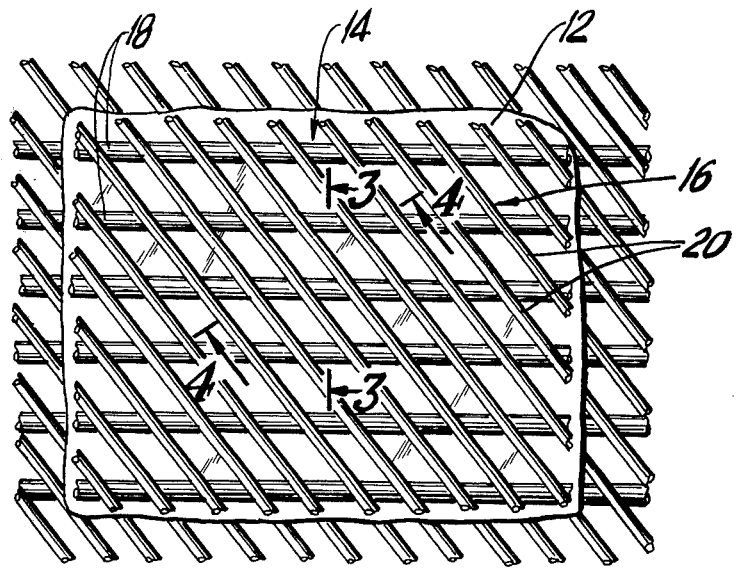
FIG. 2 is an enlarged view of a portion of the spirally wound improved non-woven support screen showing a semipermeable tubular membrane arranged therebetween.
Figure 5:
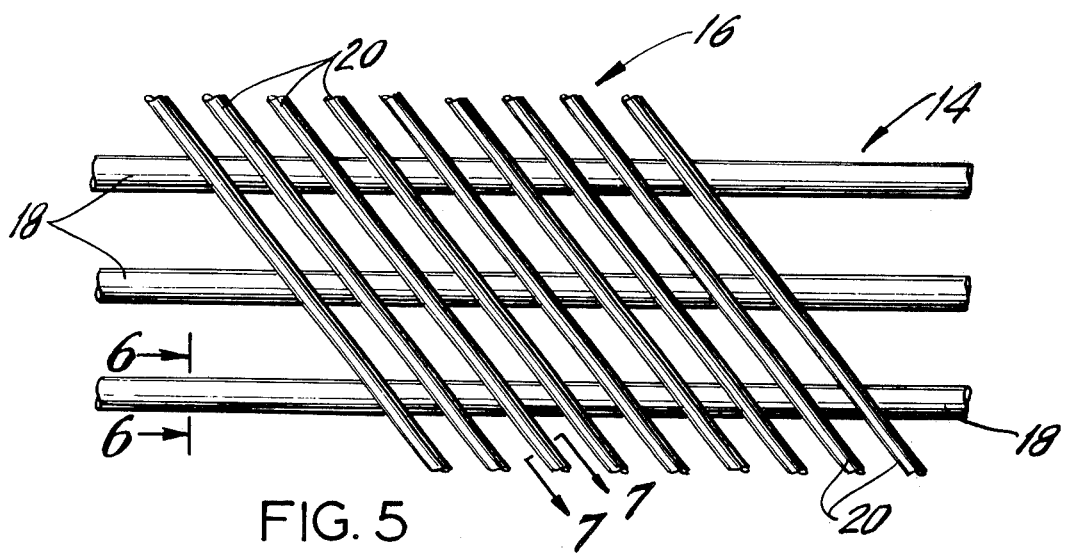
FIG. 5 is an enlarged plan view of a portion of the improved non-woven support screen according to the present invention.

Referring to FIGS. 2 and 5, the non-woven support screen 10 includes first and second sets 14 and 16 of spaced parallel filaments 18 and 20, respectively, arranged in separate planes and fixedly fused to one another at their crossover points. Advantageously, the filaments 18 and 20 may be made of polyethylene, polypropylene, or other suitable plastic material, and are formed by extrusion, although they may be formed by embossing or casting, as desired.

The filaments 18 and 20 are fixed relative to one another with the filaments 18 extending longitudinally relative to the axis of the tubular membrane 12 and concentrically about the longitudinal axis of the inner core, see FIG. 1, to provide circular flow channels for the fluid introduced into the tubular membrane 12. (In extracorporeal devices, the fluid is a body fluid, generally blood). The filaments 20 are obliquely joined to the filaments 18 to provide helical flow channels for an exchange fluid (dialyzing fluid, e.g., a saline solution) to contact the surface of semipermeable tubular membrane 12. It is well known in the art that such an oblique arrangement of filaments reduces the flow resistance of blood and exchange fluid through the coil without the need to employ separate spacers.

Figure 6:
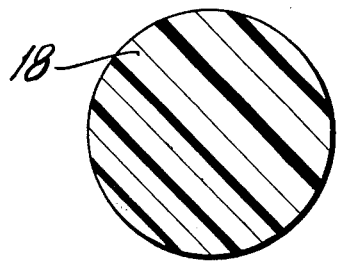
FIG. 6 is a cross-sectional view of a filament of the first set taken along line 6—6 of FIG. 5.
Figure 7:
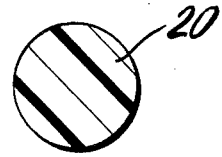
FIG. 7 is a cross-sectional view of a filament of the second set taken along line 7—7 of FIG. 5.

Referring particularly to FIGS. 5–7, it has been found that the use of oblique filaments 20 having a thickness or diameter of about 0.37 to about 0.67, most preferably about 0.47 times the thickness or diameter of the longitudinal filaments 18 provides improved control of membrane distention and allows the creation of a shallow blood compartment (shallow distended blood channels in the membrane 12) while providing gentle mixing of the blood and substantially minimizing damage thereto.

Figure 3:
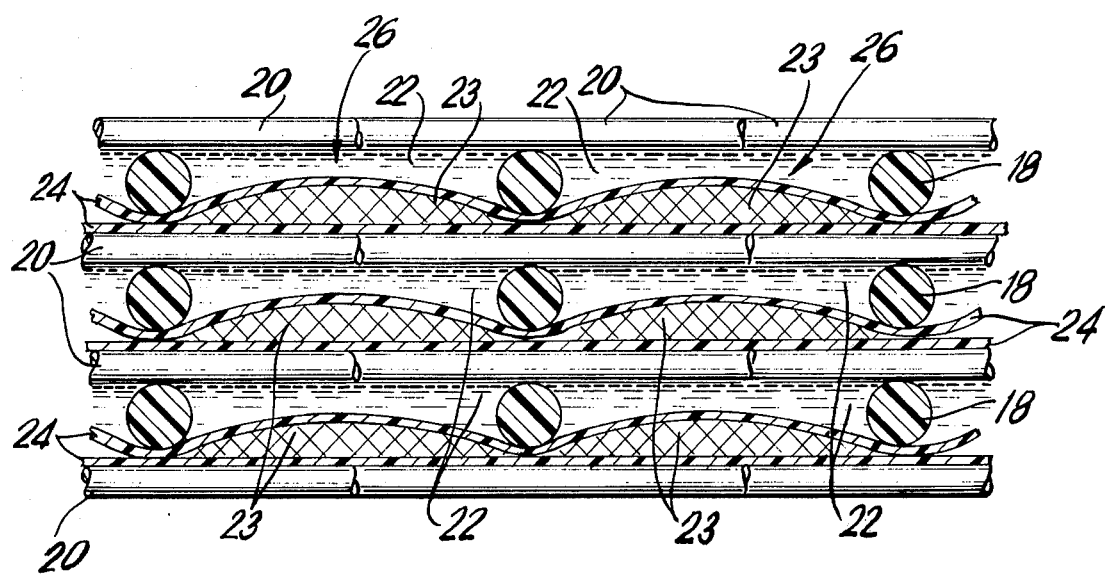
FIG. 3 is an enlarged longitudinal sectional view taken along line 3—3 of FIG. 2 showing the body fluid flow channels of the body fluid compartment of a mass transfer device.
Figure 4:
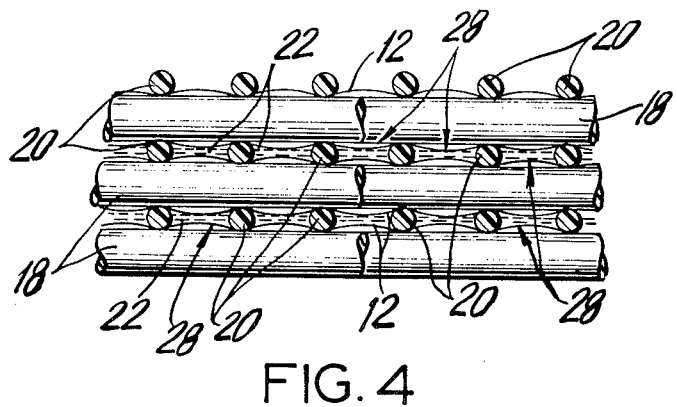
FIG. 4 is an enlarged sectional view taken along line 3—3 of FIG. 2 showing the exchange fluid flow channels of the exchange fluid compartment of a mass transfer device.

Referring also to FIGS. 3 and 4, the exchange fluid 11 provides a vigorous scrubbing effect on the membrane 12 due to the enhanced velocity gradient of the exchange fluid resulting from the limited spacing for the exchange fluid channels and the large undulations in the exchange fluid channels caused by the filaments 18. Moreover, by reducing the thickness of oblique filaments 20 a greater amount of surface area of the tubular membrane 12 is available for contact with exchange fluid as the exchange fluid 22 flows through the helical channels bounded by the oblique filaments 20, thereby maintaining a high mass transfer rate. The unique combination of increased mixing of the body fluid 23 with greater membrane surface area for exposure to the exchange fluid and improved control of membrane distention results in improved exchange efficiency.

Specifically, it has been found particularly advantageous to employ round non-woven filaments 18 and 20 in which the filaments 18 has a diameter of 0.85 MM + 0.10 MM and the filaments 20 have a diameter of 0.40 MM + 0.10 or −0.05 MM. Therefore, the maximum and minimum ratio of the diameters of filaments 20 to filaments 18 varies between about 0.37 to about 0.67 with about 0.47 being preferred. Moreover, the use of round filaments 18 and 20 has been found to substantially eliminate damage to the tubular membrane 12 which may result in leakage.

It has also been found particularly advantageous to form the support screen 10 with the filaments 20 intersecting the filaments 18 at an angle of 52° + 3° with centerline spacing between the filaments 18 being 3.5533 MM + 0.2538 MM and centerline spacing between filaments 20 being 1.6244 MM + 1.269 MM. Therefore, the maximum and minimum ratio of the spacing of the filaments 18 to the filaments 20 varies between about 2.54 and 1.88, with about 2.18 being preferred. Other parameters of the preferred support screen 10 are as follows:

| | |
|---|---|
| Thickness at intersection of fused filaments 18 and 20 | 1.05 MM + .20 MM or − .15 MM |
| Overall width | 241.3 MM + .000 MM or − 3.000 MM |
| Overall length | 500 MM |
| Filaments 18 | 9 filaments/25.4 MM Max. 8 filaments/25.4 MM Min. |
| Filaments 20 | 18 filaments/25.4 MM Max. 15.5 filaments/25.4 MM Min. |

Thus, it is apparent that for equal lengths of the support screen 10 there are approximately twice as many filaments 20 as filaments 18.

As perhaps best visualized with reference to FIG. 3, the blood 23 flowing through each blood channel 26 of the blood compartment (membrane 12) assumes a thin layer configuration with the surface of the membrane 12 in contact with the filaments 18 undergo a limited sinusoidal distention and the opposite surface of the membrane in contact with the filaments 20 being substantially fully supported to undergo only a very slight distention. Thus, masking (surface to surface contact between distended membrane layers) of the membrane 12 between overlying channels 26 is minimized to substantially maximize the surface area of the membrane 12 which is exposed to the exchange fluid. Additionally, the reduced diameter of filaments 20 expose more surface area of the membrane 12 to the exchange fluid (dialyzing fluid 22).

Advantageously, the blood 23 flowing through the blood channels 26 regularly encounters slight undulations in the membrane due to the presence of the support filaments 20 thereagainst to provide gentle agitation of the blood 23. Moreover, the spacing between and diameter of filaments 18, which define the blood channels 26, are such as to maintain low pressure perfusion (low prime).

The relationship between the diameters of filaments 18 and 20 provides gentle agitation of the blood 23 while providing a heightened scrubbing to the blood 23 to heighten purification of the blood 23 as impurities dialyze through the membrane 12 into the exchange fluid (saline solution) 22, see FIG. 4. Referring to FIG. 4, the limited space for the exchange fluid channels 28 enhances the velocity gradient of the exchange fluid 22 to heighten the scrubbing action of the exchange fluid 22 on the surfaces of the membrane 12. Additionally exchange fluid 22 regularly encounters the filaments 18 as it travels through the helical paths bounded by filaments 20 to provide turbulent agitation thereof.

The result of the unique coaction of the diameter and spacing of the filaments 18 and 20 is that the blood 23 undergoes gentle mixing while maintaining a low pressure drop in the blood channels 26 to maintain a desired low rate of ultrafiltration (water loss from the blood). Simultaneously, the exchange fluid 22 undergoes turbulent agitation resulting in accelerated purification of the blood 22, thereby improving mass transfer efficiency.

It should be understood by those skilled in the art that various modifications may be made in the present invention without departing from the spirit and scope thereof, as described in the specification and defined in the appended claims.

What is claimed is:

1. An improved non-woven support screen for mass transfer devices of the type having a support screen and a fluid transfer membrane therein, wherein the improvement comprises:
    an array of filaments of round cross-sectional area to prevent damage to the membrane including a first set of filaments spaced parallel to one another in a first plane and a second set of filaments spaced parallel to one another in a second plane, said filaments of said first set having centerlines spaced a distance of between about 1.88 to about 2.54 times the spacing between the centerlines of said filaments of said second set, said sets of filaments being affixed to one another at their crossover points and said second set of said filaments being obliquely arranged relative to said first set of filaments, the thickness of the filaments of said second set being between about 0.37 to about 0.67 times the thickness of said filaments of said first set to substantially minimize masking of the membrane by controlling membrane distention.

2. The improved non-woven support screen recited in claim 1, wherein:
    equal lengths of the support screen include approximately twice as many filaments of said second set as filaments of said first set.

3. The improved non-woven support screen recited in claim 1, wherein:
    the diameter of said filaments of said second set are about 0.47 times the diameters of said filaments of said first set.

4. The improved non-woven support screen recited in claim 1, wherein:
    said oblique angle between said sets of filaments is between about 49° to about 55°.

5. The improved non-woven support screen recited in claim 1, wherein:
    said filaments of said first set have their centerlines spaced from one another a distance of about 2.18 times the spacing between the centerlines of said filaments of said second set.

6. The improved non-woven support screen recited in claim 5, wherein:
    said filaments of said first set have a diameter of approximately 0.85 MM;
    said filaments of said second set have a diameter of approximately 0.40 MM.

7. The improved non-woven support screen recited in claim 6, wherein:
    said oblique angle between said sets of filaments is about 52°.

8. An improved non-woven support screen for mass transfer devices of the type having a support screen and mass transfer membrane therein, wherein the improvement comprises:
    an array of filaments of round cross-sectional area to prevent damage to the membrane and including a first set of filaments spaced parallel to one another in a first plane and a second set of filaments spaced parallel to one another in a second plane, said sets of filaments being affixed to one another at their crossover points, said second set of filaments having a diameter of from 0.37 to about 0.67 times the diameter of said first set of filaments, said filaments of said first set having their centerlines spaced from one another a distance of between about 1.88 to about 2.54 times the spacing between the centerlines of the filaments of said second set, and said second set of filaments being biased at an angle of between about 49° to about 55° relative to said first set of filaments, said first and second filaments coacting with the membrane to control membrane distention to substantially minimize masking of the membrane and enable the membrane to assume a thin layer configuration to thereby control the volume of the membrane.

9. The improved non-woven support screen recited in claim 8, wherein:
    said filaments of said first set have a diameter of approximately 0.85 MM and said filaments of said second set have a diameter of approximately 0.40 MM;
    said filaments of said first set have their centerlines spaced from one another about 2.18 times the spacing between the centerlines of the filaments of said second set; and
    the angle between said first and second filaments is about 52°.

* * * * *